United States Patent
Hallin

[15] 3,696,560
[45] Oct. 10, 1972

[54] ADJUSTABLE ALIGNING APPARATUS FOR MOVABLE PANELS

[72] Inventor: Peter R. Hallin, McComb, Miss.

[73] Assignee: Craft Metals, Inc., McComb, Miss.

[22] Filed: Nov. 19, 1970

[21] Appl. No.: 91,047

[52] U.S. Cl. ...........................49/425, 16/99, 16/105, 49/409, 269/60, 269/321 F, 269/321 H, 269/321 S
[51] Int. Cl. .....E05d 13/02, E05d 15/08, E05d 17/00
[58] Field of Search.......................................52/122; 49/409–411, 425, 452; 16/99, 105; 269/60, 321 F, 321 H, 321 S

[56] References Cited

UNITED STATES PATENTS

| | | |
|---|---|---|
| 2,574,496 | 11/1951 | Pomeroy.....................49/409 |
| 2,950,756 | 8/1960 | Moloney..................49/425 X |
| 2,668,318 | 2/1954 | Le Bon....................49/425 X |
| 2,893,069 | 7/1959 | Kessler.......................49/452 |
| 2,931,434 | 4/1960 | Steel.......................49/425 X |
| 3,142,096 | 7/1964 | Munchhausen..........49/425 X |
| 3,335,532 | 8/1967 | Greenbie......................52/122 |
| 2,889,587 | 6/1959 | Peterson......................49/452 |
| 3,400,504 | 9/1968 | Neisewander...............52/122 |
| 3,408,781 | 11/1968 | Pollock........................52/122 |
| 3,431,690 | 3/1969 | Halpern...................49/452 X |
| 3,512,209 | 5/1970 | Povoden......................16/105 |
| 3,237,238 | 3/1966 | Anderson.....................16/105 |
| 3,453,789 | 7/1969 | Stephenson.................52/122 |

FOREIGN PATENTS OR APPLICATIONS 587,048 11/1959 Canada.......................49/452

*Primary Examiner*—Wayne A. Morse, Jr.
*Attorney*—John R. Walker, III

[57] ABSTRACT

A movable panel supported in a frame for horizontal travel, said panel mounting a movable structure for limited horizontal movement therein and defining horizontally spaced and oppositely inclined planes, and an insert rigidly mounted in said panel and defining plane engaging surfaces adapted to engage said planes for relative movement equally up and down proportional to the relative horizontal movement of said movable structure and the fixed insert.

8 Claims, 11 Drawing Figures

PATENTED OCT 10 1972

INVENTOR.
PETER R. HALLIN

BY James B. Lake, Jr.
ATTORNEY

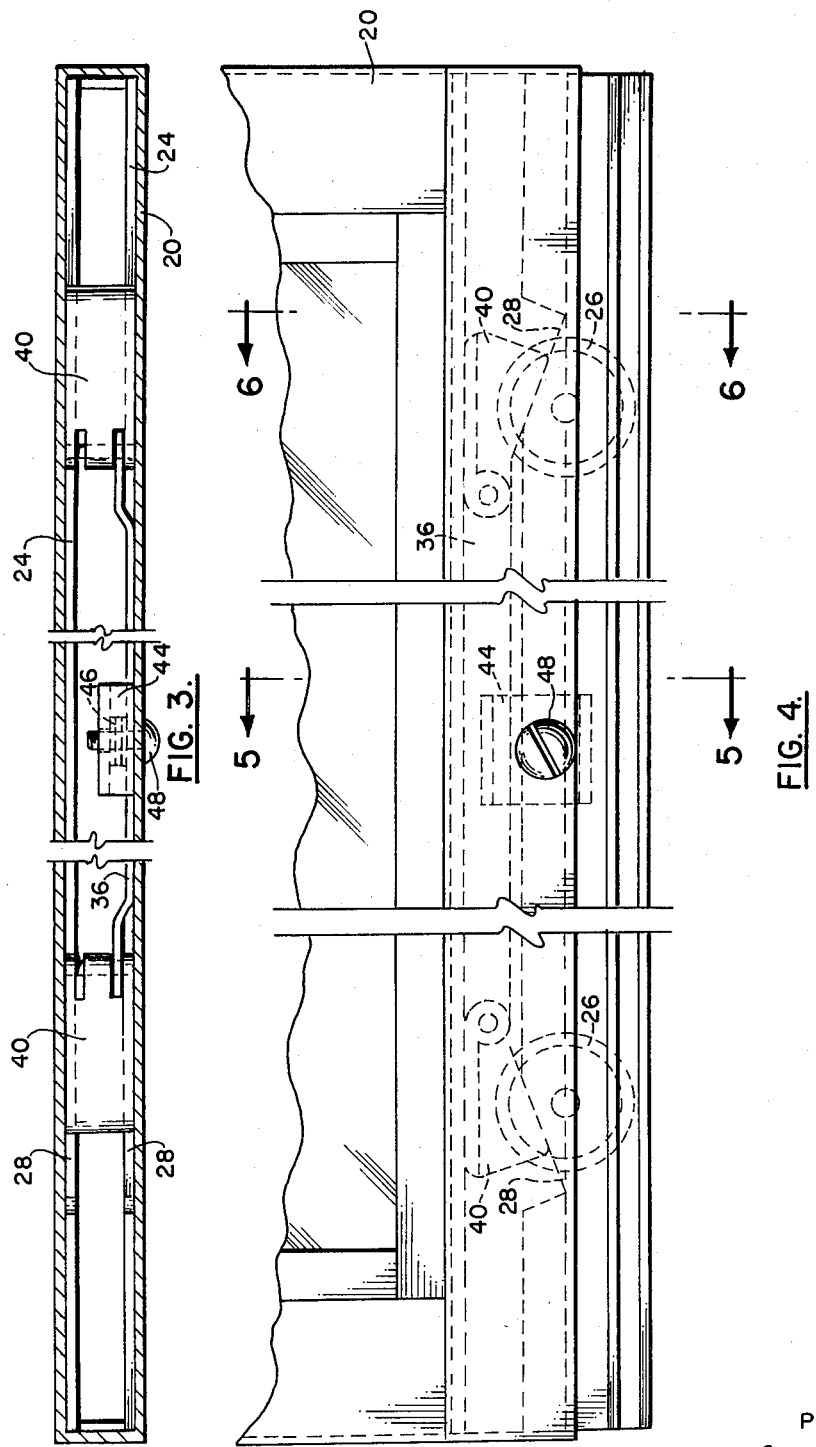

INVENTOR.
PETER R. HALLIN
BY James B. Labe, Jr.
ATTORNEY

ADJUSTABLE ALIGNING APPARATUS FOR MOVABLE PANELS

The invention relates generally to horizontally spaced-apart apparatus for supporting a movable panel in a frame, and more particularly to single adjustment supports adapted to align a movable panel in a misaligned frame.

The framing elements of movable panels are often installed with the upright elements not perpendicular, or horizontal elements being bowed or sagging. Such misalignment affects the engagement of the movable panel's vertical members with abutting upright frame elements. To bring the vertical panel and the upright frame elements into parallel engagement, it is necessary to adjustably tilt the movable panel.

Alignment of panel members and frame elements has been, and with others still is, effected by independently raising and lowering each of two wheel assemblies which are horizontally spaced apart and support the movable panel in the frame. Making such separate adjustments are tedious at best, and, when performed by inexperienced labor, ineffective and often unoperable through over-correction and with loss of weather stripping contact.

An object of the invention is to provide apparatus for simultaneously adjusting horizontally spaced supports of a movable panel in a misaligned frame.

Another object of the invention is to provide simultaneously adjustable supporting apparatus for movable panels supported by an upper or a lower frame element.

Another object of the invention is to maintain weatherstripping contact between panel and frame in all adjustments of the panel.

Other objects and a fuller understanding of the invention may be had by referring to the following description and claims, taken together with the accompanying drawings, in which:

FIGS. 1 and 2 are diagramatic elevational views illustrating the principle of the invention and the maximum correction of alignment errors in one specie of the invention, FIG. 3 is a plan view along section line 3—3 of FIG. 2, FIG. 4 is an elevational view of the matter illustrated in FIG. 3 and adjacent portions of panel and frame, FIG. 5 is a cross-sectional view taken along sectional line 5—5 of FIG. 4, FIG. 6 is a cross-sectional view taken along section line 6—6 of FIG. 4.

The invention comprises movable panels, having inserts, and supported, either by the top or bottom elements of frames, on horizontally spaced rollers mounted in said inserts. Intermediate each panel and its insert are mounted horizontally spaced elements that are simultaneously adjustable by a single adjustment to align the panel in the frame.

The first specie of the invention is illustrated by FIGS. 1-6, and the second species by FIGS. 7-11.

In both species, horizontally spaced rollers are mounted on the panel and run in tracks mounted on the frame. The single adjustment for the horizontally spaced supports comprises a relative horizontal movement between oppositely disposed and inclined planes that are rigidly spaced apart and plane-engaging surfaces that are respectively and cooperatively mounted in the panel and the insert. The plane-engaging surfaces respectively and simultaneously engage the oppositely disposed and inclined planes to move up one plane and down the other as they are relatively moved, to tilt the panel with respect to the insert proportional to the relative movement therebetween.

Figure 1:
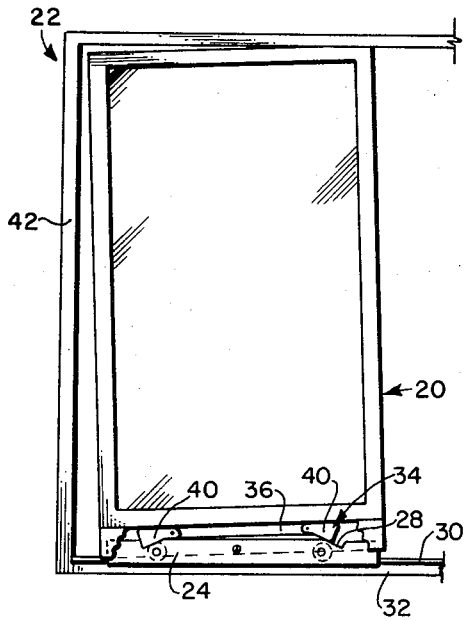
Figure 2:
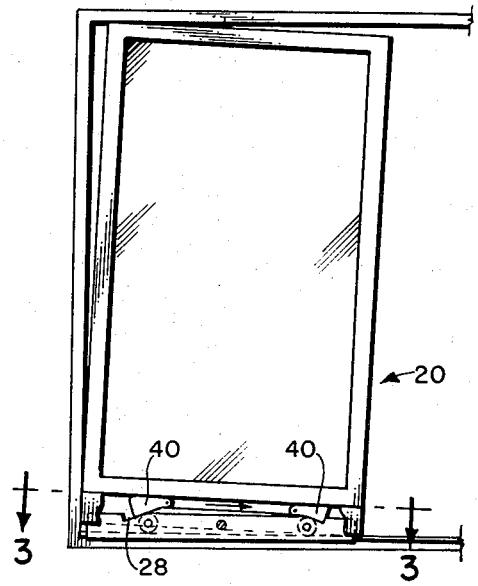

Referring to FIGS. 1 and 2, the first species of the invention comprises a panel 20 mounted in frame 22. An insert 24, on which are mounted horizontally spaced rollers 26 and weather stripping 27, defines two oppositely inclined notches 28 adjacent said rollers 26. The rollers engage tracks 30 that are integral with the frame sill element 32. A movable structure 34 is mounted intermediate the panel 20 and the insert 24. Referring to FIGS. 3 and 4 the movable structure 34 comprises a leveller bar 36 having oppositely disposed ends 38 to which are respectively pivoted two wedges 40. The wedges 40 have respectively thick and thin ends and each partially engages in the horizontally spaced notches 28. When the panel 20 is pushed firmly against the abutting frame jamb element 42, panel pressure is increased on one wedge and decreased on the other to slide them in notches 28 and move structure 34 horizontally with respect to said notches, thereby tilting the panel to conform to said jamb 42.

Figure 5:
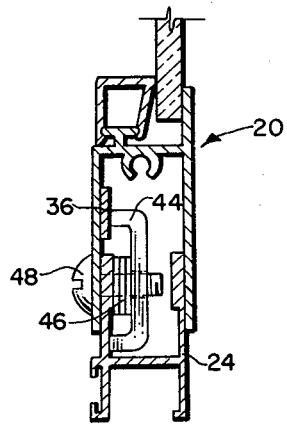
Figure 6:
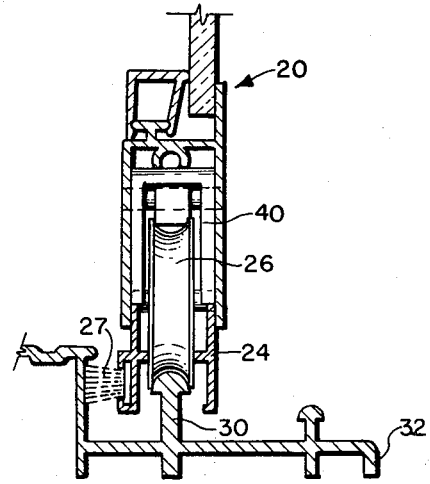
Figure 7:
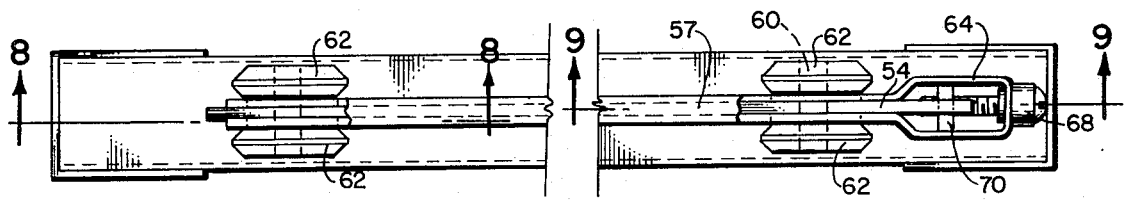
FIG. 7 is a plan view of a second specie of the invention.
Figures 8, 9:
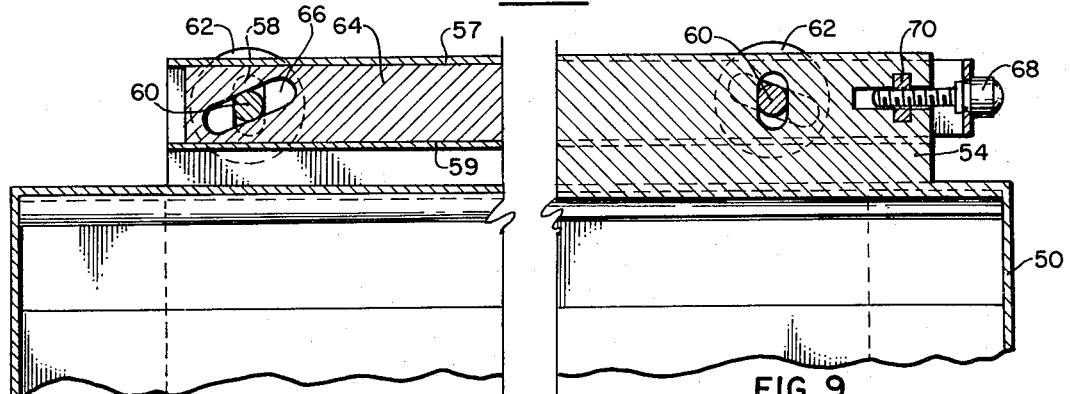
FIG. 8 is a partial sectional view taken along section line 8—8 of FIG. 7.
FIG. 9 is a partial sectional view taken along section line 9—9 of FIG. 7.
Figure 10:
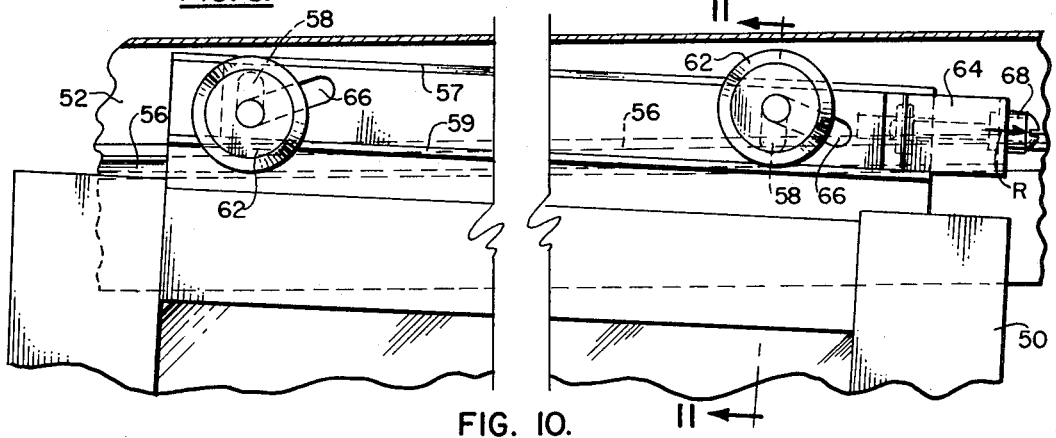
FIG. 10 is similar to FIGS. 8 and 9 and shows a limit of tilt.
Figure 11:
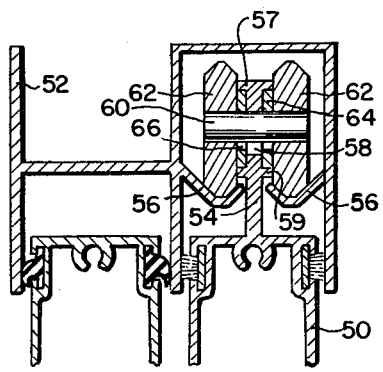
FIG. 11 is a cross-sectional view taken along section line 11—11 of FIG. 7.

Referring to FIGS. 5 and 6, a C-shaped clamp 44 is center tapped and mounted in insert 24 to engage with its upper end the leveller bar 36 of the movable structure 34, and with its lower end insert 24. A coil spring 46 biases the clamp 44 out of engagement with the leveller bar 36. A screw 48 mounted in the panel 20 and adapted to engage in the C-clamp center tap through the insert 24 secures and releases the movable structure to and from the insert.

To make the adjustments necessary to align the panel with a misaligned frame, the screw 48 is loosened releasing the movable structure 34, then the panel is pushed firmly closed against the jamb, the movement and pressure causing the panel to press down on the top of one of the wedges 40 and lift up on the other wedge to slide them horizontally down one of said notches and up the other to support the panel in tilted closed position. The screw 48 is then tightened to lock the relative positions of the wedges 40 and the notches 28, and the adjustment is complete. The weatherstripping 27, being mounted on the insert 24 with the rollers, remains in contact with the frame sill.

Referring to FIGS. 7-11, the second species of the invention comprises a panel 50 mounted on a frame 52. The panel 50 has an integral stem 54 extending from its upper surface. The upper element 51 of frame 52 mounts dual tracks 56 between which the stem 54 extends. The stem 54 defines upper and lower flanges 57 and 59 respectively, and elongated vertical slots 58 that are horizontally spaced apart. Axles 60 on which are mounted rollers 62 are received for rotation in slots 58. The rollers 62 are adapted to engage the tracks 56.

A moving structure 63 is mounted intermediate the panel 50 and the frame 52 and comprises a control bar 64 slidably mounted on the stem 54 between the flanges 57 and 59, said bar defining two oppositely disposed and inclined slots 66, the center points of which are respectively coincident with the vertical slots 58. The axles 60 also engage in said inclined slots 66. A thumb screw 68 is mounted for rotation in the end of control bar 64. A nut 70 is fixed in the stem 54 and adapted to engage the thumb screw 68, the rotation of which moves the control bar horizontally relative to the stem 54.

To align the panel 50 with the frame 52, the thumb screw 68 is rotated to move the control bar 64 relatively horizontally with respect to the stem 54. The axles 60, carrying the rollers 62, engage in both of the slots 58 and 66 to remain horizontally spaced in slots 58 but with their centers shifted vertically in opposite directions in slots 66 to thereby tilt the panel. Thumb screw 68 is rotated sufficiently to tilt the panel to conform to the frame.

I claim:

1. In the combination of a vertical panel mounted for horizontal travel in a stationary frame with horizontally spaced rollers mounted from said panel and horizontal tracks mounted on said frame, said rollers and tracks engaging and cooperating in said horizontal travel of said panel, improved adjustment apparatus for tilting said panel in a vertical plane to conform the vertical alignments of said panel and frame, said apparatus comprising: insert means mounted on said panel, a movable structure mounted on said insert means and operably coupled to said panel for limited horizontal relative movement with respect to said insert means, said movable structure defining a pair of oppositely inclined planes that are horizontally spaced and respectively adjacent the opposite ends of said structure; said insert means having plane-engaging means defining a pair of surfaces simultaneously engaging respectively said pair of oppositely inclined planes of said movable structure for relative movement of said surfaces respectively equally up one and down the other of said planes when said movable structure is horizontally moved relative to said insert means thereby to tilt said panel relative to said frame by an amount proportional to the amount of horizontal movement of said movable structure relative to said insert means, and said insert means mounting said rollers respectively adjacent said plane engaging means.

2. Improved adjustment apparatus as described in claim 1 wherein said insert means is mounted in the bottom of said panel and said movable structure comprises: a leveller bar having oppositely disposed ends slidably mounted on said insert means and extending between said horizontally spaced rollers; two similar wedges defining said inclined planes and having respectively thick and thin ends and horizontally pivoted by their thin ends to the respective ends of said leveller bar, said inclined planes extending downward and outward beyond said rollers.

3. Improved apparatus as described in claim 2 wherein said wedges are channeled to pass over said rollers.

4. Improved apparatus as described in claim 1 wherein is included a weatherstripping mounted on said insert means and engaging said frame and means for locking and releasing said insert means and said movable structure relative to one another.

5. Improved apparatus as described in claim 4 wherein said means for locking and releasing comprises: a C-shaped clamp including a pair of arms, said clamp being center tapped to define screw threads, said clamp engaging said insert means with one arm and said movable structure with the other arm; and a screw threaded to engage in said screw threads and mounted for rotation in said insert means for tightening and loosening said "C" shaped clamp in its engagement.

6. Improved adjustment apparatus as described in claim 1 wherein said insert means is mounted in the top of said panel and said movable structure comprises: a control bar having oppositely disposed ends and slidably mounted on said insert means, said control bar defining oppositely inclined slots respectively adjacent said oppositely disposed ends, said slots defining said inclined planes.

7. Improved apparatus as described in claim 1 wherein said insert means comprises: a stem having vertically spaced and parallel longitudinal flanges and oppositely disposed ends, said stem being integral with the top of said panel and defining vertical slots adjacent each said end, said movable structure being received between said flanges, and axles mounted in said vertical slots and defining said plane engaging means, said rollers being mounted on said axles; and means for locking and releasing said insert and said movable structure relative to one another.

8. Improved apparatus as described in claim 7 wherein said means for locking and releasing comprises: a thumb screw mounted for rotation in one end of said movable structure; a nut threaded on said thumb screw, said nut being nested in said stem and held stationary thereby, whereby the rotation of said thumb screw moves said movable structure horizontally, otherwise the insert and movable structure remains locked.

* * * * *